United States Patent [19]

Lepori et al.

[11] Patent Number: 5,180,770
[45] Date of Patent: Jan. 19, 1993

[54] BINDING COMPOSITIONS FOR LIGNOCELLULOSIC COMPOSITES AND METHOD FOR THE PREPARATION THEREOF

[75] Inventors: Agostino Lepori; Ignazio Zavatteri; Mario Cova, all of Varese, Italy

[73] Assignee: Presidenza Del Consiglio Dei Ministri, Rome, Italy

[21] Appl. No.: 765,507

[22] Filed: Sep. 26, 1991

Related U.S. Application Data

[63] Continuation of Ser. No. 389,886, Aug. 4, 1989, abandoned.

[30] Foreign Application Priority Data

Aug. 8, 1988 [IT] Italy ............................. 21682 A/88

[51] Int. Cl.⁵ ..................... C08L 31/04; C08L 1/00
[52] U.S. Cl. .................................. 524/563; 524/564; 524/733; 524/589; 524/832
[58] Field of Search .......................... 524/700, 563

[56] References Cited

U.S. PATENT DOCUMENTS 3,931,088  1/1976  Sakurada et al. ................. 524/501

Primary Examiner—Joseph L. Schofer
Assistant Examiner—Wu C. Cheng
Attorney, Agent, or Firm—Morgan & Finnegan

[57] ABSTRACT

Binding compositions for lignocellulosic composites comprising an aqueous emulsion containing at least one polyisocyanate and at least one water-dispersed acetovinyl resin having a glass transition temperature (Tg) lower than 5° C. These compositions impart green tack cohesion to the resinate lignocellulosic material.

13 Claims, No Drawings

BINDING COMPOSITIONS FOR LIGNOCELLULOSIC COMPOSITES AND METHOD FOR THE PREPARATION THEREOF

This is a continuation of co-pending application Ser. No. 07/389,886, filed on Aug. 4, 1989, now abandoned.

DESCRIPTION OF THE INVENTION

The present invention relates to binder compositions for lignocellulosic composites and to a process for their preparation.

More particularly, the present invention relates to binding compositions for lignocellulosic composites based on polyisocyanates, to a process for their preparation, and to the use of these compositions for the manufacture of chip panels or similar products.

By the term "polyisocyanates" as used in the present description and claims, is meant organic compounds having low, middle, and/or high molecular weight containing at least two —NCO groups.

Examples of low molecular weight polyisocyanates are those of the formula:

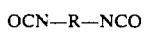

$$OCN-R-NCO \quad (I)$$

wherein R represents an alkyl, cycloalkyl, aryl, or alkylaryl radical containing from 1 to 25 carbon atoms, such as meta- and/or para-phenylenediisocyanate, 2,4-toluenediisocyanate alone or admixed with its isomer 2,6-toluenediisocyanate, 4-4'-diphenyl-methane-diisocyanate, hexamethylenediisocyanate, 4,4'-dicyclohexyl-methane-diisocyanate, 1-isocyanate-6-isocyanate-methyl-3,5,5-trimethylcyclohexane (or isophoronediisocyanate), 2,2,4-trimethylhexamethylenediisocyanate in admixture with the isomer 2,4,4-trimethylhexamethylenediisocyanate, etc.

Example of middle or high molecular weight polyisocyanates are those having different degrees of condensation which may be obtained by the phosgenation of aniline-formaldehyde condensates. These products consist of mixtures of polymethylenspolyphenylisocyanates having the formula:

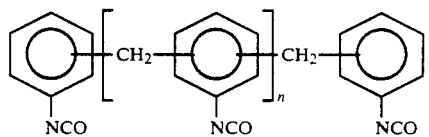

wherein n represents an integer higher than or equal to 1.

Particularly preferred polyisocyanates are the mixtures of polymethylenepolyphenylisocyanates having a 2.6–2.8 average functionality; these products are marketed under different names such as "Tedimon 31" of the Montedipe Company, "PaPi" of the Upjohn Company, or "Mondur MR" of the Mobay Company.

It is already known to use polyisocyanates, preferably in the form of aqueous emulsions, as binders for composites based on lignocellulosic materials, e.g., wood, bark, bagasse, straw, rice chaff, etc., in the form of granulates, chips, fibers or meal as described in the European Patent Application No. 13,112 as well as in Italian Patent Application No. 20,027 A/88.

It is also known that polyisocyanates produce a cohesive action exclusively during the molding of the composite when carried out at a high temperature in the range of from 150° to 200° C. Consequently, by the use of such binders the green tack cohesion of the mattress, that is the vibration- and shifting-tightness of the layers of the resinate materials deposited on the bearing element and cold pre-pressed at 20°–30° C., is practically nill within obvious workability limits.

In particular, when use is made of high rate production plants the lack of green tack cohesion of the mattress is the cause of significant drawbacks such as, e.g., the impossibility of processing the mattress itself. Such drawbacks are reported in Holz als Roh- und Wreckstoff 1977, 35(8), 295–299 and 1985, 43(10), 423–427 and in Wilhelm-Klauditz Institute Bericht No. 14, "Diisiocyanat und Polyurethanklebstoffe fuer Holz and Holzwerkstoffe," Braunschweig (Federal Republic of Germany), March 1986.

Therefore, the availability of polyisocyanic binding compositions for lignocellulosic composites, adapted to produce green tack cohesion, appears very valuable and highly interesting from the industrial point of view.

However, the practical experience until now in this field has turned out to be wholly unsatisfactory even when products (e.g., resorcinol resins) positively tested in combination with adhesive products (e.g., amino adhesives) having a chemical nature different from that of the isocyanates are used.

H. J. Deppe and K. Ernst have reported in Holz als Roh- und Werkstoff 1977, 35(8), 295–299 on this matter.

In accordance with the present invention, it has now been discovered that a suitable green tack cohesive level for polyisocyanic binding compositions to be used for the manufacture of chip panels or similar manufactured articles, may be achieved by using water-dispersed acetovinylic resins having a suitable plasticity as additives for polyisocyanate.

Therefore an object of the present invention is to provide binding compositions for lignocellulosic composites comprising an aqueous emulsion containing at least one polyisocyanate and at least one water-dispersed acetovinylic resin having a glass transition temperature (Tg) lower than 5° C.

More particularly, acetovinylic resins are preferred which have a glass transition temperature between −15° and 0° C. and a film production minimum temperature of about 0° C.

Examples of acetovinylic resins useable in the binding compositions of the present invention are the "soft" acetovinyl compolymers obtained by copolymerizing vinyl acetate with flexibility-giving monomers optionally combined with hardening monomers.

Examples of monomers giving flexibility are the olefins such as ethylene, high molecular weight acrylic and metacrylic monomers, such as 2-ethylhexylacrylate, n- or i-butylacrylate, laurylacrylate, stearylacrylate, methoxyacrylate, ethoxymethylmethacrylate, etc.; esters of unsaturated diacids such as dibutyl maleate; diisobutyl maleate, etc., esters of linear or branched fatty acids of vinyl alcohol, such as vinyl versatate, vinyl laurate, vinyl octoate, vinyl caprate, vinyl stearate, etc.

Examples of hardening monomers are vinyl halides such as vinyl chloride, vinyl bromide, etc., the low molecular weight methacrylic esters such as methylmethacrylate, ethylmethacrylate, etc., nitriles such as acrylonitrile, etc.

the flexibility-giving monomers, optionally combined with the hardening monomers, may be used in quantity up to 70% by weight, calculated on the acetovinyl resin, and generally between 10 and 60%. The hardening monomers, when present, are used in such amounts as to keep the Tg of the acetovinylic resin lower than 5° C.

Further examples of acetovinylic resins useable in the binding compositions of this invention are the acetovinylic homopolymers plasticized with external additives in a quantity between 5 and 50% by weight on the dry homopolymer.

Examples of the above-mentioned additives are the organic phthalates such as the di-n- or i-butylphthalates, the butylbenzylphthalates, etc., the organic phosphates such as the tricresylphosphates, the phthalylglycolates such as the phthalylbutylglycolate, the polyesters, etc.

More generally, all the products listed in the Encyclopeda of Chemical Technology, edited by Interscience Publishers (J. Wiley and Sons, Inc., Second edition (1968), page 775 and page 778) may be used.

The aqueous emulsions comprising the binding compositions of the present invention contain a quantity of dry substance between 10 and 80% by weight. More particularly, these emulsions contain from 2 to 20% by weight, and preferably from 5 to 10% by weight, of acetovinyl resin and from 8 to 60% by weight, preferably from 35 to 50% by weight, of polyisocyanate.

The binding compositions of the present invention may be obtained by dispersing at least one polyisocyanate as such, that is without modifications to make easy the preparation of the emulsion, in a dilute aqueous polyacetovinylic dispersion and under agitation.

As polyacetovinylic dispersions one may use those available on the market and known as Vinavil (Vinavil EVA 201, Vinavil EVA 479, Vinavil MV 50, Vinavil SL, etc.) of the Montedipe Company, Vinnapas of the Wacker Company, Mowilith of the Hoechst Company, etc.

The polyacetovinylic dispersion is diluted in such a way as to have a quantity of resin equal to 1-15% by weight, based on the dry lignocellulosic material.

The polyisocyanate may be added to the polyacetovinyl dispersion over a short time, for instance within 5-60 seconds, and with high agitation speeds, for instance higher than 8000 rpm, by means of turboagitators.

Alternatively, the binding compositions of the present invention may be obtained with not very high agitation speeds, for instance between 1000 and 2000 rpm, by using stabilizers of the polyisocyanate such as cellulose esters, e.g., the carboxymethylcelluloses, used in quantities equal to 0.1-5% by weight based on the total weight of the emulsion and added to the polyacetovinyl dispersion before the polyisocyanate.

The composition of the present invention may advantageously be used as binders of cellulosic materials, preferably lignocellulosic materials, such as wood, bark, bagasse, straw, bamboo, rice chaff, etc., in the form of granulates, chips, fibers or meal and more generally for the manufacture of chip panels or other composites, such as plywood, masonite, laminar boards, etc., without any problem for the industrial operation.

Preferably, these compositions are added to the lignocellulosic material in a quantity between 2 and 50% by weight (calculated on the chips), preferably between 5 and 20%, and allow one to obtain green tack cohesion values of the resinate material higher than 1 kg, and generally between 2.0 and 3.5 kg.

For the determination of the green tack cohesion, pellets of 50 mm diameter are formed using 30 g of the resinate material (for instance wood chips), and applying a load of 500 kg for 30 second. Thereafter, the pellets undergo a breaking at the dynamometer and the necessary load at break was observed.

It has also been found possible to obtain satisfactory green tack, values by preparing the compositions of the present invention in situ. This may be done by spraying separately onto the cellulosic material a polyisocyanate emulsion, such as those described in European Patent Application No. 13,112, and a polyacetovinylic dispersion, of the type available on the market, diluted to about 40% of the dry weight, or by spraying together the two pre-mixed emulsions. In this case also the quantities of the polyacetovinylic dispersion, giving rise to the cellulosic material having satisfactory green cohesion values, are not high and are between 1 and 15% of dry resin on the resinate material.

In order still better to understand the present invention and to practically perform the same, some illustrative but not limitative examples are given hereinafter.

EXAMPLE 1

(a) 72 g of Vinavil EVA (dry substance 56%) of Montedipe S.p.A. are added to 408 of deionized water.

Thereafter, 320 g of polymethlenepolyphenylisocyanate Tedimon 31 of Montedipe S.p.A. are fed under agitation of high velocity (10,000 rpm) using a turboagitator type Ultra Turrax T 50 Provided with emulsifying head T 45 N of the Janke Kunkel GmbH.

600 g of this emulsion are used to resinate 3000 g of wood chips, of the type industrially used for external chip panels.

(b) 288 g of deionized water are additioned with 72 g of Vinavil EVA 201, and then 240 g of Tedimon 31, according to the above procedure.

450 g of the resulting emulsion are used to resinate 3000 g of wood chips, of the type industrially used for the inner layers of chip panels.

(c) On a plate having a 0.25 m² surface is laid a layer of 700 g of resinated chips mentioned at point (b) and again 700 g of resinated chips mentioned at point (a). The mattress or mat is molded at 175° C. for 4 minutes to obtain a 16 mm panel V100 (DIN 68763) (crude), showing characteristics reported in the following table. The green tack cohesion of the resinated chips is reported in the same table.

EXAMPLE 2

(a) 600 g of a 1.18% aqueous solution of carboxymethylcellulose having a substitution degree equal to 0.82, Hoeppler viscosity of the 2% aqueous solution measured at 20° C. equal to 100 mPa.S, and pH=6.4, are mixed under agitation with 400 g of polymethylenepolyphenylisocyanate (Tedimon 31).

The thus-obtained dispersion is agitated at high velocity for at most 30 seconds.

(b) 600 g of this polyisocyanic emulsion are additioned under mild agitation with 75 g of Vinavil EVA 201, diluted at 40%, and thereafter the whole mixture thus-obtained is used to resinate 3000 g of wood chips of the type industrially used for the external layer of chip panels.

(c) To 450 g of the polyisocyanic emulsion mentioned at point (a) there are added 75 g of Vinavil EVA 201 diluted at 40%. Thereafter, the whole mixture thus-obtained is used to resinate 3000 g of wood chips of the type industrially used for the inner layers of chip panels.

(d) The panel is prepared and is molded by working as described in the preceding Example 1.

A panel V100 is obtained. The characteristics of this panel, together with the green tack cohesion value of the resinated chips, are reported in the table below.

EXAMPLE 3

This is worked as in the preceding Example 2, but the wood chips are resinated by feeding separately the two emulsions, the polyisocyanic emulsion and the acetovinylic emulsion.

A panel V100 is obtained. Its characteristics, together with the green tack cohesion value of the resinated chips, are reported in the table below.

EXAMPLE 4

The work is carried out as in the preceding Example 3, but the polyisocyanic emulsion only is fed into the resinating machine, without using the acetovinylic emulsion.

A panel V100 is obtained. Its characteristics, together with the green tack value of the resinated chips, are reported in the table below.

EXAMPLE 5

(a) 380 g of deionized water are additioned with 100 g of Vinavil MV50 (dry substance 59.5%) of Montedipe S.p.A.

Thereafter, 320 g of Tedimon 31 are fed and the wood chips for the external layers of a panel are resinated as described under (a) of Example 1.

(b) To 260 g of deionized water 100 g of Vinavil MV50 are added and thereafter 240 g of Tedimon 31 are fed and the wood chips for the external layers of the panel are resinated as described under (a) of Example 1.

The panel is prepared and is molded by working as described above in Example 1.

A panel V100 is obtained. Its characteristics, together with the green tack cohesion value of the resinated chips, are reported in Table 1.

EXAMPLE 6

(a) To 402 g of deionized water there are added 78 g of Vinavil EVA (dry substance 51%) of Montedipe S.p.A.

Thereafter 320 g of Tedimon 31 are fed and the wood chips for the external layers of the panel are resinated as under (a) of Example 1.

(b) To 282 g of deionized water, 78 g of Vinavil EVA 479 of Montedipe S.p.A. are added and the wood chips for the inner layer of the panel are resinated as under (b) of Example 1.

(c) The panel is prepared and molded by working as in Example 1. A panel V100 is obtained. Its characteristics are reported in the table.

EXAMPLE 7

(a) To 402 g of an aqueous 0.6% solution of carboxymethylcellulose Tylose C30 of Hoechst there are added 78 g of Vinavil EVA 201.

Thereafter, 320 g of Tedimon 31 are added within 2-4 minutes, under middle speed agitation (2000-3000 rpm).

Finally, the wood chips for the external layers of a panel are resinated as under (a) of Example 1.

(b) To 282 g of an aqueous 0.6% solution of tylose C30 there are added 78 g of Vinavil Eva 201, then Tedimon 31 is fed as in the preceding part and the wood chips for the inner layer of the panel are resinated as under (b) of Example 1.

(c) A panel V100 is prepared and molded by working as in Example 1.

A panel V100 is obtained; its characteristics are reported in the table.

TABLE

|  |  | Example | | | | | | |
|---|---|---|---|---|---|---|---|---|
|  |  | 1 | 2 | 3 | 4 | 5 | 6 | 7 |
| Green tack cohesion of the resinate chip | Kg | 2.5 | 2.5 | 3 | 0 | 2 | 2.5 | 2.5 |
| Characteristics of the panels | | | | | | | | |
| Thickness (after smoothing) | mm | 14.7 | 15.3 | 14.7 | 15.3 | 14.6 | 14.1 | 14.1 |
| Volumetric mass | Kg/m$^3$ | 645 | 683 | 650 | 668 | 649 | 660 | 665 |
| Resistance to tensile stress V100 | N/mm$^2$ | 0.30 | 0.48 | 0.37 | 0.36 | 0.29 | 0.51 | 0.41 |
| Resistance to bending stress | N/mm$^2$ | 18.0 | 20.8 | 18.1 | 19.5 | 18.6 | 18.0 | 18.5 |
| Softening | % | 10.6 | 8.1 | 9.2 | 8.8 | 9.1 | 8.2 | 9.1 |
| Water content | % | 6.1 | 7.8 | 7.4 | 7.2 | 7.9 | 8.6 | 8.1 |

Remark: for the determination of the green tack cohesion there were prepared tablets of 50 mm diameter using 30 g of resinated chips, applying 500 Kg for 30 seconds. The tablets were then subjected to break at the dynamometer, thus observing the necessary load at break.

What is claimed is:

1. An essentially totally water-based polyisocyanic binding composition, useful to give green tack cohesion values greater than 1.0 kg to lignocellulosic materials in the form of granulates, chips, fibers or meal, said binding composition comprising an aqueous emulsion containing at least one polyisocyanate and at least one water-dispersed acetovinylic resin having a glass transition temperature (Tg) less than about 5° C.

2. Compositions according to claim 1, wherein the acetovinylic resins have a glass transition temperature between −15° and 0° C. and a minimum film forming temperature of about 0° c.

3. Compositions according to claim 1 or 2, wherein the acetovinylic resins are obtained by copolymerizing the vinyl acetate with flexibilizing-monomers optionally combined with hardening-monomers.

4. Compositions according to claim 3, wherein the flexibilizing-monomers are selected from the class consisting of olefins, high molecular weight acrylic and methacrylic monomers, esters of unsaturated diacids, and esters of linear or branched fatty acids of vinyl alcohol.

5. Compositions according to claim 3, wherein the hardening-monomers are selected from the class consisting of vinyl halides, low molecular weight methacrylic esters, and nitriles.

6. Compositions according to claim 1 or 2, wherein the flexibilizing-monomers, optionally combined with hardening-monomers, are used in a quantity up to 70% by weight, calculated on the acetovinylic resin.

7. Compositions according to claim 1 or 2, wherein the flexibilizing-monomers, optionally combined with hardening-monomers, are used in a quantity between 10 and 60% by weight, calculated on the acetovinylic resin.

8. Compositions according to claim 1 or 2, wherein the acetovinylic resins are the acetovinylic homopolymers plasticized with external agents in a quantity between 5 and 50% by weight, calculated on the dry homopolymer.

9. Compositions according to claim 8, wherein the plasticizing agents are selected from the class consisting of organic phthalates, organic phosphates, and polyesters.

10. Compositions according to claim 1 or 2, wherein the aqueous emulsions contain a quantity of dry substance between 10 and 80% by weight.

11. Compositions according to claim 10, wherein the emulsion contains from 2 to 20% by weight of acetovinylic resin and from 8 to 60% by weight of polyisocyanate.

12. Compositions according to claim 10, wherein the emulsion contains from 5 to 10% by weight of acetovinylic resin and from 35 to 50% by weight of polyisocyanate.

13. An essentially water-based polyisocyanic binding composition, useful to give green tack cohesion values greater than 1.0 kg to lignocellulosic materials in the form of granulates, chips, fibers or meal, said binding composition consisting essentially of an aqueous emulsion containing at least one polyisocyanate and at least one water-dispersed acetovinylic resin having a glass transition temperature (Tg) less than about 5° C.

* * * * *